(12) United States Patent
Mori et al.

(10) Patent No.: US 7,328,235 B2
(45) Date of Patent: Feb. 5, 2008

(54) MULTIPLE PROCESSING METHOD

(75) Inventors: Kinji Mori, Tokyo (JP); Hiroyuki Yashiro, Gunma (JP)

(73) Assignee: IHI Aerospace Co., Ltd., Tokyo (JP)

( * ) Notice: Subject to any disclaimer, the term of this patent is extended or adjusted under 35 U.S.C. 154(b) by 467 days.

(21) Appl. No.: 10/101,714

(22) Filed: Mar. 21, 2002

(65) Prior Publication Data

US 2002/0138550 A1 Sep. 26, 2002

(30) Foreign Application Priority Data

Mar. 23, 2001 (JP) ............................ 2001-086329

(51) Int. Cl.
*G06F 15/16* (2006.01)

(52) U.S. Cl. ...................... 709/202; 709/214

(58) Field of Classification Search ................ 709/229, 709/203, 233, 202, 232, 214; 701/207; 711/173; 714/12, 701; 718/105; 713/375

See application file for complete search history.

(56) References Cited

U.S. PATENT DOCUMENTS

| | | | | |
|---|---|---|---|---|
| 4,021,784 A | * | 5/1977 | Kimlinger | ................... 713/401 |
| 4,363,094 A | * | 12/1982 | Kaul et al. | ................. 710/113 |
| 4,428,048 A | * | 1/1984 | Berlin, Jr. | ................... 713/600 |
| 5,016,168 A | * | 5/1991 | Liu | ............................ 712/216 |
| 5,329,630 A | * | 7/1994 | Baldwin | ..................... 711/173 |
| 5,423,044 A | * | 6/1995 | Sutton et al. | ............... 710/200 |
| 5,459,864 A | * | 10/1995 | Brent et al. | ................. 718/105 |
| 5,625,836 A | * | 4/1997 | Barker et al. | .............. 709/214 |
| 5,710,935 A | * | 1/1998 | Barker et al. | ................. 712/20 |
| 5,734,825 A | * | 3/1998 | Lauck et al. | ................ 709/233 |
| 5,751,932 A | * | 5/1998 | Horst et al. | .................... 714/12 |
| 5,964,846 A | * | 10/1999 | Berry et al. | ................ 713/375 |

(Continued)

FOREIGN PATENT DOCUMENTS

JP 03-266011 11/1991

OTHER PUBLICATIONS

Avizienis, et al., The STAR (Self-Testing And Repairing) Computer: An Investigation of the Theory and Practice of Fault-Tolerant Computer Design, IEEE Transactions on Computer, vol. c-20, No. 11, Nov. 1971, 10 pages, United States.

*Primary Examiner*—Thong Vu
(74) *Attorney, Agent, or Firm*—Sughrue Mion, Pllc.

(57) ABSTRACT

A multiprocessing method suitable for realizing satisfactory online processing by synchronizing data processing in respective element processor nodes in spite of a loosely coupled system used with the plural element processor nodes driven with individual clocks, the method is characterized in that the plural element processor nodes driven with the individual clocks and an information transfer medium through which the respective element processor nodes provide and acquire data each other are used, the respective element processor nodes start cyclic data processing according their own judgment at timing of providing or acquiring trigger data, perform predetermined calculation after acquiring the input data from the data source so as to provide calculation result into the information transfer medium, and acquire a plurality of calculation result provided by other element processor nodes from the information transfer medium to determine operation result obtained from the plural calculation result through logical decision as output data, thereby outputting the output data into the output target from any one of the element processor nodes having the output data.

12 Claims, 8 Drawing Sheets

U.S. PATENT DOCUMENTS

| | | | |
|---|---|---|---|
| 6,009,472 A * | 12/1999 | Boudou et al. | 709/232 |
| 6,078,681 A * | 6/2000 | Silver | 382/133 |
| 6,279,119 B1 * | 8/2001 | Bissett et al. | 714/12 |
| 6,557,123 B1 * | 4/2003 | Wiencko et al. | 714/701 |
| 7,024,463 B1 * | 4/2006 | Hitomi et al. | 709/214 |
| 2002/0174282 A1 * | 11/2002 | Murakami et al. | 710/306 |
| 2003/0009518 A1 * | 1/2003 | Harrow et al. | 709/203 |
| 2003/0176965 A1 * | 9/2003 | Padmanabhan | 701/207 |

* cited by examiner

⟸▨⟹ TRANSMISSION OF INPUT DATA-REQUEST MESSAGE INTO DF
◎ RECEPTION OF INPUT DATA FROM DF
⟨C⟩ CALCULATION
⟸▭⟹ TRANSMISSION OF CALCULATION RESULT INTO DF
△ RECEPTION OF MESSAGE OF OTHER PN FROM DF
⟨VO⟩ LOGICAL DECISION SUCH AS MAJORITY
⟨VE⟩ VERIFY
⟸■⟹ TRANSMISSION OF OUTPUT DATA INTO DF
↕ MESSAGE ACQUIRING WINDOW

MULTIPLE PROCESSING METHOD

BACKGROUND OF THE INVENTION

1. Field of the Invention

This invention relates to a multiprocessing method to be used for a multiprocessing system (fault tolerant computer system) including a plurality of element processor nodes.

2. Description of the Prior Art

In the multiprocessing system (redundant system) realizing a fault tolerance by multiplexing an element processor node (a processor node, a processor element, a CPU node or a node), when some of the element processor nodes break down and becomes into offline states, there is a difference depending on executing application in treatment of the damaged element processor nodes.

Referring to an example of application for a space vehicle, in a case of the computer which is mounted on a navigation and guidance control system of the rocket, when one of the element processor nodes breaks down, the computer cuts the damaged element processor node down instead of recovery so as to keep online states of the other normal element processor nodes, since its control cycle is very short (in the order of several ten milliseconds) and its operating time is also short (approximately 10 minutes). In other words, even though the element processor nodes are decreased by one, continuance of online processing is given priority over recovery of the damaged element processor node because the control cycle and the operating time are short.

On the other hand, in a computer mounted on an attitude control system of the artificial satellite, it is preferable to prevent decrease of the element processor nodes as far as possible so that the damaged element processor node is recovered, since allowable time for stopping control caused by the fault is relatively sufficient (in the order of 1~3 seconds) and the operating time also extends from several months to several years. In other words, when one of the element processor nodes breaks down and becomes into the offline state, the computer starts a standby multiplexing system, causes the normal element processor nodes to copy a memory content for the damaged element processor node, or executes a roll back process to restart the process after going back to the point when all the element processor nodes have normally operated. In this time, the online processing should be stopped because the normal element processor nodes concern repair and recovery of the damaged element processor node.

Moreover, space planes such as the space shuttle have both characteristics of the rocket and the satellite. In the space shuttle, for example, a fivefold multiprocessing system is introduced, and the damaged element processor node is cut down and switched over to the standby multiplexing system in an orbital phase in the orbit, while recovery of the damaged element processor node is not performed in a critical phase such as launching and landing since the short control cycle is required in the same manner as the aforementioned computer mounted on the rocket.

Therefore, the exclusive multiprocessing system has been conventionally researched, developed and made practicable according to the respective application of the rocket, the artificial satellite and the space plane. Additionally, there is description as to the conventional multiprocessing system in "Fault-tolerant Multi-processor Operating System for Engineering Test Satellite-VI Attitude Control Electronics (Shunsuke Tanaka, et al.)" SANE89-40.

However, in the conventional multiprocessing system described above it is impossible to increase nor decrease the element processor node during the online processing and there is a problem in that it is difficult to lower the cost because the nodes specially designed according to the respective applications are used. Furthermore, the damaged element processor node has been cut down in the case where the control cycle and the operating time are short, but even in this case, it is naturally clear that it is more desirable to be possible to recover the damaged element processor node as the multiprocessing system.

SUMMARY OF THE INVENTION

The present invention is attained in consideration of the conventional situation described above and it is an object of the invention to provide a multiprocessing method, which is possible to execute excellent online processing by synchronizing data processing in respective element processor nodes in spite of being loosely coupled system (asynchronous system) used with the plural element processor nodes driven by individual clocks, and possible to cope with recovery of a damaged element processor node without stopping the online processing even in a case of a breakdown in one or more of the respective element processor nodes, further possible to increase and decrease the element processor node even during the online processing.

The construction of the multiprocessing method according to this invention for accomplishing the above-mentioned object is characterized in that in a case of performing calculation through a plurality of element processor nodes on basis of input data inputted form a data source and outputting calculation result into an output target as output data, the plural element processor nodes driven with individual clocks and an information transfer medium through which the respective element processor nodes provide and acquire data each other are used, the respective element processor nodes start cyclic data processing according their own judgment at timing of providing or acquiring trigger data, perform predetermined calculation after acquiring the input data from said data source to provide calculation result into the information transfer medium, and acquire a plurality of calculation result provided by other element processor nodes from said information transfer medium to determine operation result obtained from the plural calculation result through logical decision as the output data, thereby outputting the output data into the output target from any one of the element processor nodes having the output data. The multiprocessing method according to a preferred embodiment of this invention is characterized in that said respective element processor nodes have a window function for determining data acquired within a predetermined time as normal and for determining data acquired out of the predetermined time as abnormal. The multiprocessing method according to another preferred embodiment of this invention is characterized in that the element processor nodes detect themselves as to presence of their own faults, and the element processor node which detects its own fault performs acquisition of the input data, the calculation and acquisition of the calculation result provided to the information transfer medium by the normal element processor node after going into an offline state and performing repair processing individually, and autonomously recovers its online state by synchronizing with a data processing cycle of the normal element processor node when calculation result obtained by its own calculation coincides with calculation result obtained by the normal element processor node. The multiprocessing method according to other preferred embodiment of this invention is characterized in that the element processor node which detects its own fault stops to provide data into the information transfer medium until the calculation result obtained by its own calculation coincides with calculation result obtained by the other element processor node.

It is noted that sensors, for example, may be referred as the data source and that actuators, for example, may be referred as the output target. Additionally, as the trigger data provided or acquired by the respective element processor nodes, there are an input data request message which is request for executing predetermined data processing, an input data request message which is provided by the other element processor node, input data which is inputted cyclically from the data source and output data which is outputted into the output target, for example.

According to the multiprocessing method of this invention, although the method is a loosely coupled system (asynchronous system) used with the plural element processor nodes that are driven by individual clocks, it is possible to start data processing by the respective element processor nodes according to their own judgment, and perform excellent online processing by synchronizing the respective data processing by each of the element processor nodes. In addition, it is possible to cope with the autonomous recovery of the damaged element processor node without stopping the online processing of normal element processor nodes in a case where one or more of the element processor nodes detect their own faults, and it becomes possible to increase and decrease the element processor node even during the online processing. Whereby, the multiprocessing method according to this invention contributes to realization of the multiprocessing system superior in augmentability, extensibility and versatility.

In the multiprocessing method according to the first preferred embodiment of this invention, the respective element processor nodes have the window function for determining data acquired within a predetermined time as normal and for determining data acquired out of the predetermined time as abnormal, so that it is possible to eliminate abnormal data to perform the data processing satisfactory by only using normal data even if the abnormal data generated for some reason are inputted to the element processor node on the online processing in addition to the aforementioned effect.

In the multiprocessing method according to the second preferred embodiment of this invention, when some of the element processor nodes detect their own faults, the damaged element processor node is possible to autonomously recover the online processing by synchronizing with the data processing in the normal element processor nodes after performing the repair processing in the offline state individually and confirming itself to completely return to normal, so that the multiprocessing method can be adapted to various application independently of length of the control cycle and the operating time without deterioration of robust characteristics such as reduction of the redundancy in addition to the aforementioned effects. The multiprocessing method according to this invention can be commonly used not only in the application for the space vehicle, such as for example, the navigation and guidance control system of the rocket, the attitude control system of the artificial satellite, data handling or mission apparatus control and so on, but also in the general control application, is very excellent in the versatility, and a superior effect can be obtained in that it is possible to realize highly cost down of various control systems.

Furthermore, according to this multiprocessing method, there is no limitation in the number of element processor nodes to execute the online processing and the number of element processor nodes which concurrently recover the processing, and extremely speaking, it is possible to perform autonomous recovery of a plurality of damaged element processor nodes without stopping the online processing even when only one of normal element processor node remains, and possible to commonly use the multiprocessing method in the system from with a small number of element processor nodes to with more than hundreds of those.

In the multiprocessing method according to the third preferred embodiment of this invention, the element processor node detecting its own fault does not provide calculation result obtained by its own calculation to the information transfer medium until this element processor node autonomously recovers the online processing, so that it is possible to completely remove the possibility that the calculation result obtained by the damaged node have bad influence on the normal element processor nodes maintaining the online processing, and possible to realize further more improvement of the data process function in addition to the aforementioned respective effects.

DESCRIPTION OF THE PREFERRED EMBODIMENTS

Figure 1:
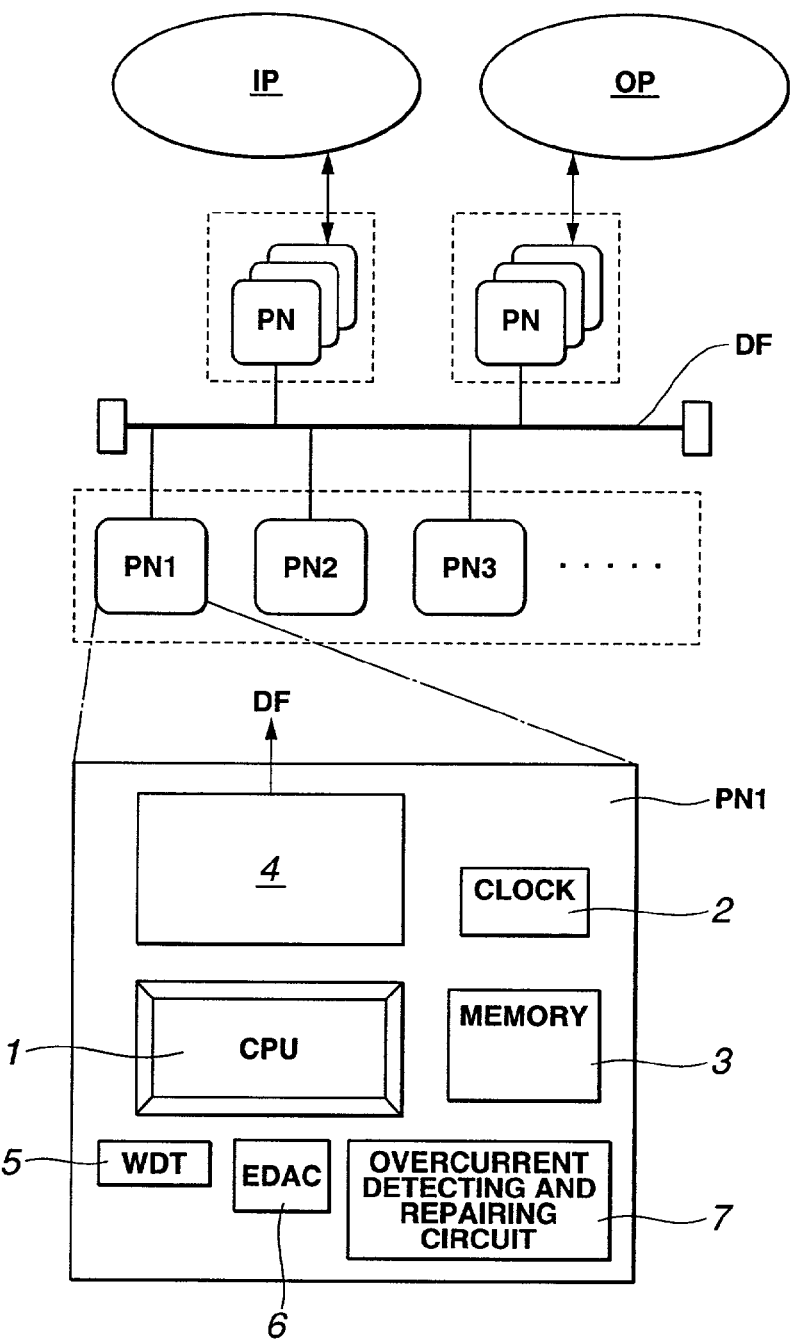
FIG. 1 is a block diagram illustrating an embodiment of a multiprocessing system to which the multiprocessing method according to this invention is applied.

FIG. 1 is a block diagram illustrating one embodiment of a multiprocessing system to which the multiprocessing method according to this invention is applied. The illustrated multiprocessing system is so designed as to perform calculation on basis of input data inputted from a data source IP, such as a sensor or so, and to output the calculation result of as output data into an output target OP, such as an actuator or so. The multiprocessing system is provided with a plurality of element processor nodes PN1 to PN3, and a common information transfer medium DF between the data source IP, the output target OP, and the respective element processor nodes PN1 to PN3. The respective element processor nodes PN1 to PN3 are connected to the information transfer medium DF through a bus so as to be possible to provide and acquire data each other through this information transfer medium DF. In the case shown in FIG. 1, the data source IP and the output target OP are connected to e element processor nodes PN for input and output by dedicated lines, and connected to the information transfer medium DF through these element processor nodes PN.

It is noted that though three element processor nodes PN1 to PN3 are shown in the multiprocessing system of the drawing, the number of them should not be limited. It is also noted that the information transfer medium DF may be multiplexed in a case where required communication speed and traffic could not obtained or redundancy should be applied to the information transfer medium DF in view of reliability, and the number of them should not be limited also in this case. Furthermore, the element processor nodes for input and output can be multiplexed according to requirement of safety and reliability, and the number of them should not be limited.

Each of the element processor nodes PN1 to PN3 in the multiprocessing system, as shown in FIG. 1 after magnification with respect to one (PN1) of them, is provided with a central processing unit (CPU) 1, a clock 2 for driving, a memory 3 and an information transfer medium controller 4 for providing its own data to the information transfer medium DF and acquiring the input data and data of the other element processor nodes PN2 and PN3 from the information transfer medium DF, and further provided with, for example, a watchdog timer 5, an error detecting and correcting circuit (EDAC) 6, an overcurrent detecting and repairing circuit 7, and a logical decision function, a cycle timer function and a window function in the central processing unit 1 and so on, as a fault detecting means for detecting its own fault and performing repair processing after making itself into an offline state. Additionally, in a case the information transfer medium DF is the multiple system, the information transfer medium controllers 4 should be provided as many as the number corresponding to the number of them.

In the multiprocessing system described above, there exists only the information transfer medium DF as a data interface between each element processor node PN1 to PN3, and any other interface does not exist fundamentally. The respective element processor nodes PN1 to PN3 performs the data providing entirely against the information transfer medium DF and also performs the data acquisition entirely from the information transfer medium DF. That is, this multiprocessing system is introduced with a loosely coupled system (asynchronous system) using the plural element processor nodes PN1 to PN3 that are driven by individual clocks 2.

Figure 2:
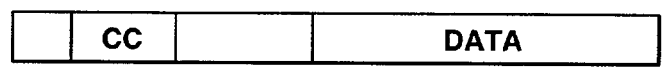
FIG. 2 is an explanatory drawing showing a data format to be provided from the element processor node to the information transfer medium.

The data to be provided into the information transfer medium DF do not have a destination address, but have a content code CC showing stored contents of the sensor data and data of the calculation result as showing the format in FIG. 2. Therefore, the element processor node certifies the content code CC of the data and processes this data in only case of necessity.

Figure 3:
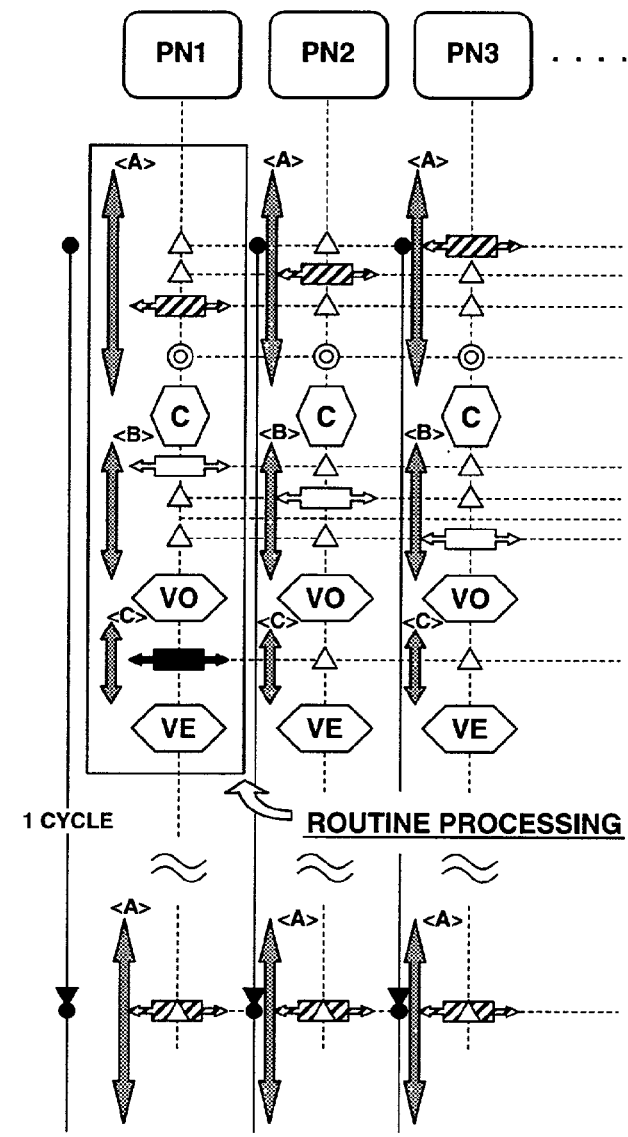
FIG. 3 is an explanatory drawing showing a data processing flow in the multiprocessing system shown in FIG. 1.
Figure 3:

The respective element processor nodes PN1 to PN3 operates the respective function autonomously by interruption of a timer counting clock 2 or by the acquisition of data from the information transfer medium DF. Each of the element processor nodes PN1 to PN3 provides an input data-request message respectively into the information transfer medium DF, and acquires the input data-request messages provided by the other element processor nodes from the information transfer medium DF at the time for acquiring the input data as shown in FIG. 3. In this time, the respective element processor nodes PN1 to PN3 consider the data provided or acquired in the first place as trigger data, and starts cyclic data processing according to their own judgment at timing of providing or acquiring the trigger data. Accordingly, as is apparent from FIG. 3, the starting time of the data processing by the respective element processor nodes PN1 to PN3 is in agreement with each other even if there is a time lag in the timing of providing the input data-request messages, since each of the element processor nodes PN1 to PN3 has acquired the input data-request messages by the other element processor nodes.

Successively, the respective element processor nodes PN1 to PN3 acquire the input data from the data source IP through the information transfer medium DF to perform calculation C on basis of the input data, and provide data of the calculation result to the information transfer medium DF again. The respective element processor nodes PN1 to PN3 acquires data having the content code CC registered in advance from the reprovided calculation result data, performs logical decision processing VO, such as a majority operation according to the number of the data acquired by the respective processor nodes to make the operation result obtained by the logical decision as output data, and provide the output data into the information transfer medium DF from the element processor node having the output data. These output data are outputted into the output target OP.

Furthermore, the respective element processor nodes PN1 to PN3 acquire the output data provided into the information transfer medium DF, verify (VE) whether the element processor node which ought to output data outputs the output data with correct contents or not, and complete one cycle of the data processing. Since the respective element processor nodes PN1 to PN3 start one cycle of the data processing at the time of providing or acquiring the trigger data as described above, the respective data processing is to be synchronously performed thereafter.

Although the aforementioned data processing is explained concerning the case where the multiprocessing system requests the input data actively, the respective element processor nodes PN1 to PN3 may perform the processing after acquiring the input data inputted from the data source IP through the information transfer medium DF without providing the input data-request message in another case where the data source IP provides the input data into the information transfer medium DF cyclically or at arbitrary timing. In this case, the input data from the data source IP are made to the trigger data and the respective element processor nodes PN1 to PN3 starts to perform the cyclic data processing according to their own judgment at the timing of acquiring these input data, hereinafter the respective data processing is performed synchronously.

In the system illustrated in FIG. 1, the data source IP and the output target OP are connected to the information transfer medium DF through the element processor nodes PN for input and output. The element processor node PN for input acquires the input data from the data source IP in response to the input data-request message from the multiprocessing system (or by their own judgment according to a kind of application), and performs the required data processing, subsequently provides the result to the information transfer medium DF. Additionally, the element processor node PN for output acquires the output data from the element processor node through the information transfer medium DF to drive the output target OP.

Thus, in the multiprocessing method of the aforementioned multiprocessing system, there is no exclusive interface among the element processor nodes PN1 to PN3 other than the information transfer medium DF, and the hardware of other element processor nodes is scarcely affected by ON-OFF operation of power switch or recovery of a certain element processor node. Accordingly, the data processing of the element processor nodes PN1 to PN3 may be synchronized in spite of the loosely coupled system (asynchronous system) driven by the individual clocks 2, and the element processor node which detects its own fault is so designed as to determine timing of the recovery independently as acquiring the data provided from other normal element processor nodes as described later.

Since there is no destination address in the message to be is exchanged in the information transfer medium DF, the element processor node to provide the message needs not to know the element processor node existing in the information transfer medium DF, and it is not necessary to notify the element processor node to be provided in advance. On the other hand, the element processor node to acquire the message does not ask the other element processor nodes to provide the message.

According to the aforementioned characteristics, the respective element processor nodes PN1 to PN3 are possible to provide and acquire the data autonomously, and possible to perform the online processing independently of states of other element processor nodes. Furthermore, it is also possible to detect their own faults by using the autonomously acquired data and to recover without affecting other element processor nodes.

Next, an explanation will be given about the functions of this multiprocessing system required for routine operation. As these functions, there are a message acquiring window function, a cycle timer function, an input data acquiring function, a calculating function, and a calculation result outputting function, a logical decision function, an output data outputting function and a matchability checking function.

The message acquiring window function is used for determining data acquired from the information transfer medium DF within the predetermined set time as "normal" and performing the processing using these normal data, and for determining data acquired out of the set time as "abnormal". Therefore, even if the abnormal data generated for some reason are inputted into the element processor node in the online processing, the abnormal data are eliminated and the satisfactory data processing is performed by using only the normal data. This window function is executed by means of the respective processor nodes PN1 to PN3 used with the individual timers and so on.

Figure 7:
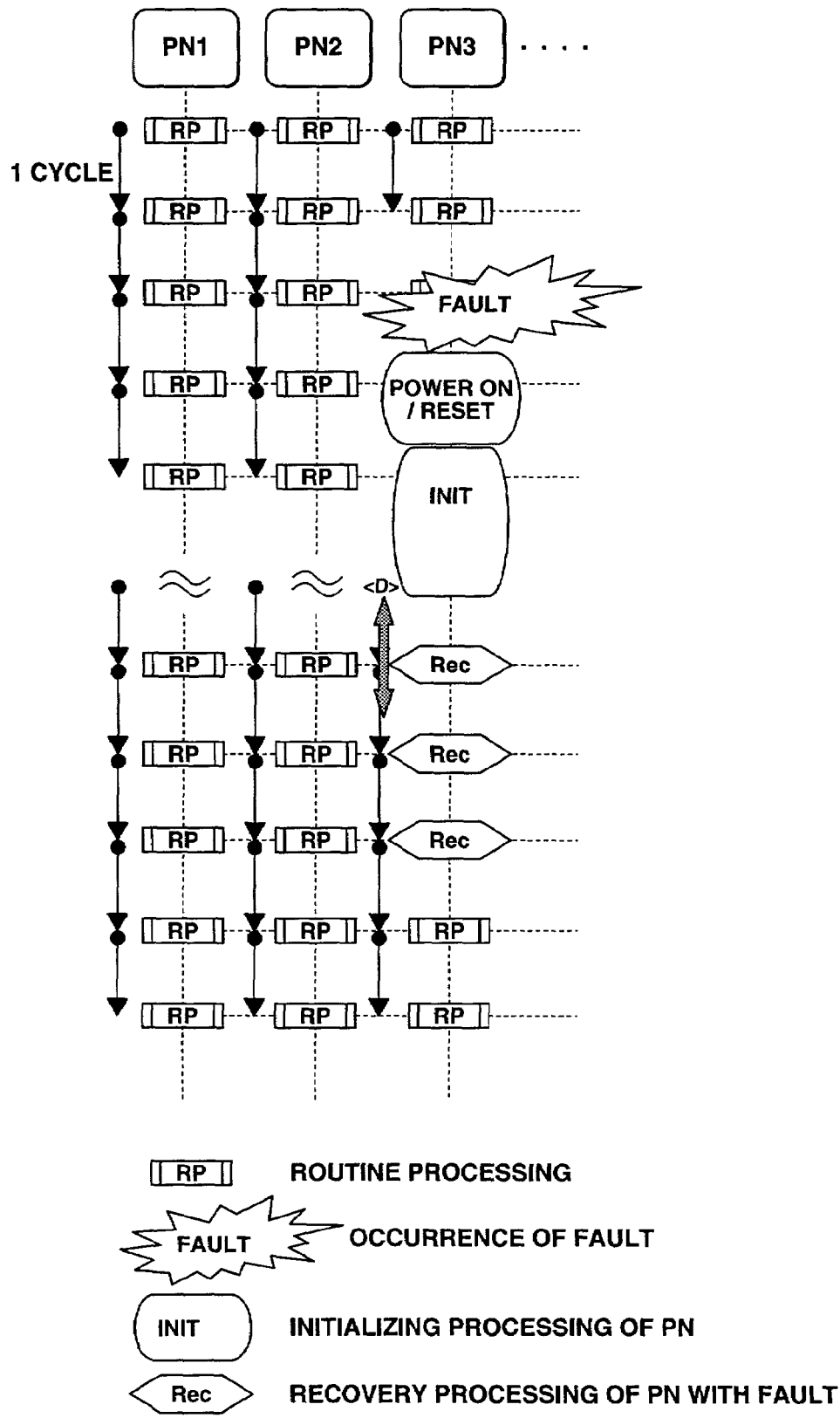
FIG. 7 is an explanatory drawing macroscopically showing the recovery processing flow of the damaged element processor node.

In this window, there are a window <A> for acquiring the input data-request message provided by the other element processor nodes and the input data, a window <B> for acquiring data of the calculation result, a window <C> for acquiring the output data as shown in FIG. 3, and a window <D> for acquiring the input data-request message after the initialization following ON operation and resetting of the power as shown in FIG. 7.

The cycle timer function is necessary in a case of application such that the respective element processor nodes PN1 to PN3 acquires input data cyclically and outputs output data cyclically, and the element processor nodes PN1 to PN3 respectively include the cycle timers therein. This cycle timer can be composed of either software or hardware. The cycle timer provides the input data-request message to the information transfer medium DF at the time of counting the predetermined cycle Tc (seconds). The cycle timer is also restarted in earlier timing between the time when the timer provides the input data-request message and the time when the timer acquires the input data-request message at first from the other element processor nodes in the window <A>.

The input data acquiring functions is used for acquiring the input data into the window <A> from the information transfer medium DF, and the respective element processor nodes PN1 to PN3 use the input data for the calculation C. The input data is provided to the information transfer medium DF, when the element processor node for input PN connected to the information transfer medium DF acquires the input data-request message, or after the element processor node for input PN acquires the input data from the data source IP at arbitrary timing to perform the required processing according a kind of application.

The calculating function is used for performing the predetermined calculation by using the acquired input data, and in a case of application, which requires previous calculation result data, or previous input data, such as calculation processing for obtaining speed or position from input data of an acceleration sensor, for example, these data are stored in the memory 3.

The calculation result outputting function is used for providing the calculation result (or halfway result according to necessity) of the calculation C as the calculation result data to the information transfer medium DF, and the result data are provided including integrated value into the information transfer medium DF in a case of the application to be used with the integrated value.

The logical decision function is used for performing the logical decision VO, which is represented by the majority operation, using their own calculation result data by the respective element processor nodes PN1 to PN3 and the calculation result data by the other element processor nodes acquired in the window <B>, and successive errors caused by using the previous error data are avoided by replacing its own calculation result data stored in the memory 3 in the calculation C with the calculation result data selected through the logical decision in a case its own result data are not selected by the logical decision.

The output data outputting function is used for causing any one of the element processor nodes PN1 to PN3 to output the final output data, and assigns a peculiar identification (ID) to each of the element processor nodes PN1 to PN3. The respective element processor nodes PN1 to PN3 are able to determine that which element processor node is normal and which element processor node is abnormal by the aforementioned logical decision function. The respective element processor nodes PN1 to PN3 determine autonomously whether they should output the output data by themselves or not by determining in advance the element processor node having the smallest number of the identification to output its own calculation result data among the element processor nodes determined as normal, for example.

The matchability checking function is used for verifying (VE) whether the respective element processor nodes PN1 to PN3 acquire the output data provided into the information transfer medium DF and the element processor node which ought to output data outputs the output data with correct contents or not. The result of verification is outputted to the external as monitor data for example, and can be utilized in other system in such a manner as being checked by an operator.

Figure 4:
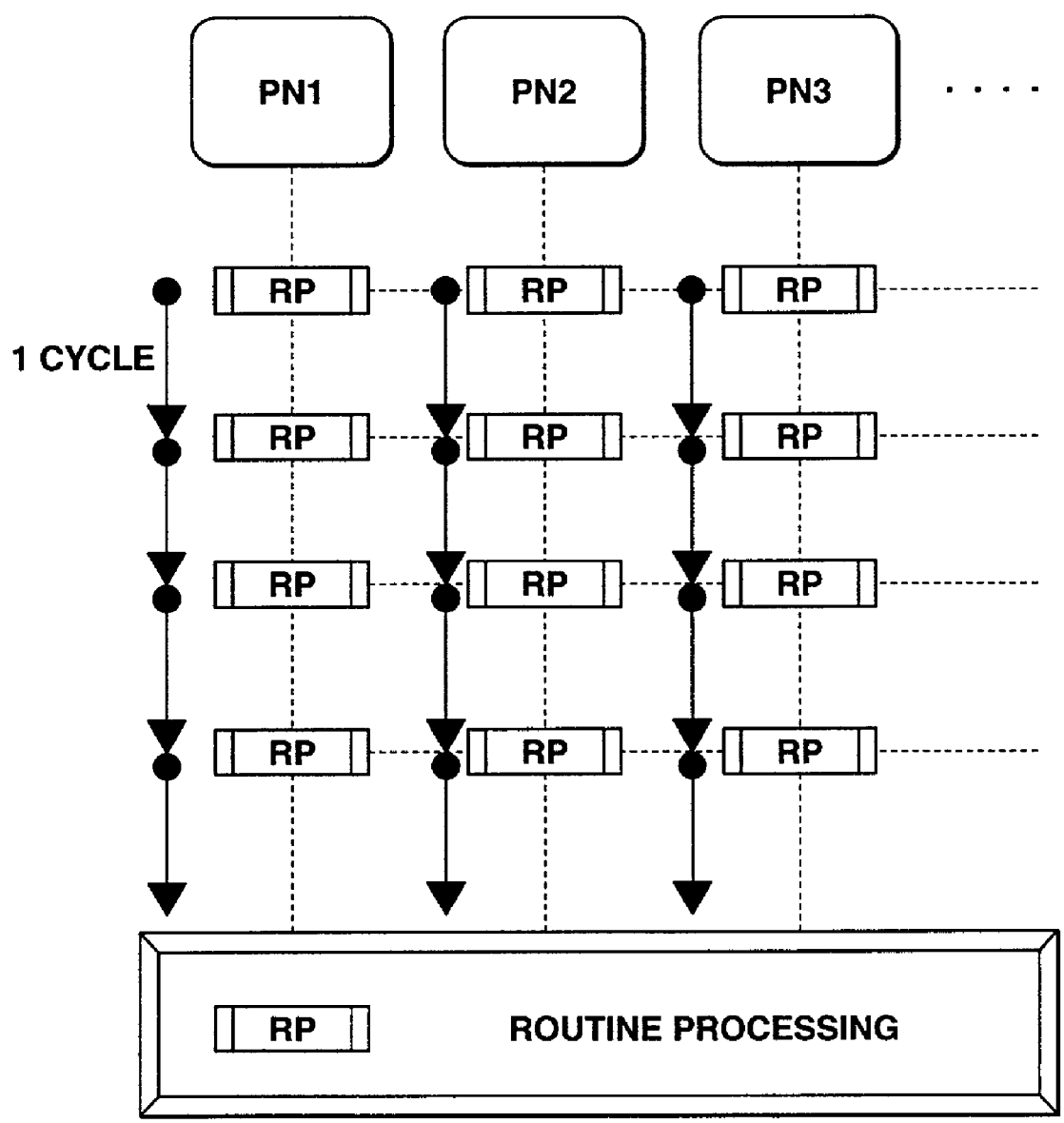
FIG. 4 is an explanatory drawing macroscopically showing a data processing in the multiprocessing method shown in FIG. 1.
Figure 5:
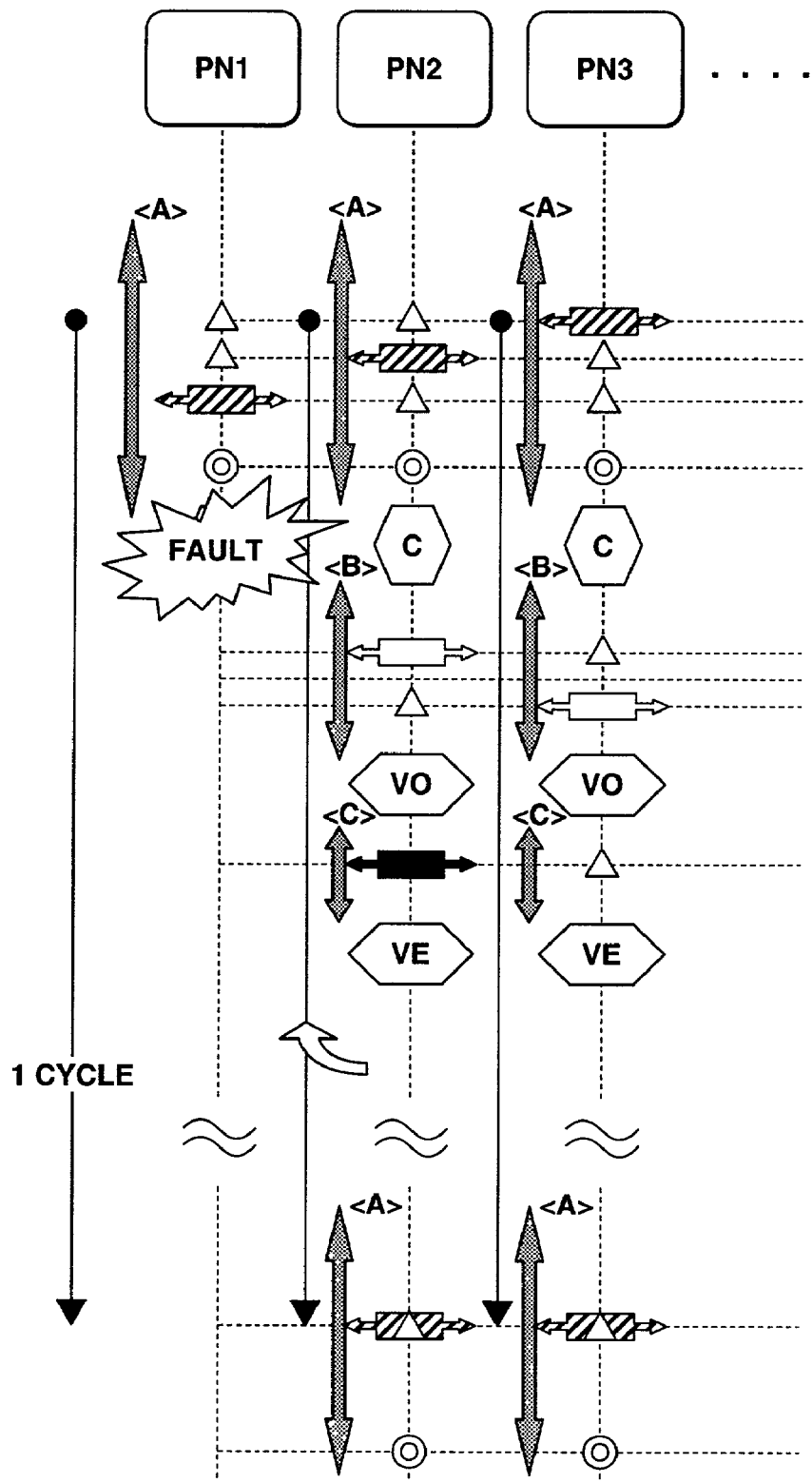
FIG. 5 is an explanatory drawing showing a data processing flow at the time of occurrence of a fault.

FIG. 3 is a drawing illustrating a series of operations (routine processing RP) of the aforementioned respective functions. The time passes according to going downwards in this drawing. FIG. 4 is a drawing of illustrating a situation where the routine processing shown in FIG. 3 is performed repeatedly over a long time. In a case of a cyclic application, synchronization is realized among the respective element processor nodes PN1 to PN3 through the information transfer medium DF by repeating the routine processing at constant cycle Tc (seconds). Furthermore, even if the fault occurs in one of the element processor nodes PN1 to PN3, that is in the element processor node PN1 as shown in FIG. 5, for example, the other element processor nodes PN2 and PN3 can continue the online processing without any influence and it is possible to output the correct output data as the multiprocessing system.

An explanation will be given below as to a case where a fault occurs in any one of the element processor nodes.

The respective element processor nodes PN1 to PN3 detect occurrence of their own faults autonomously through the error detecting and correcting circuit 6 added to the memory 3, the watchdog timer 5, the overcurrent detecting and repairing circuit 7, or the logical decision using the calculation result data of the other element processor nodes, acquisition of the abnormal data out of the set time by the window function and so on. At the time of occurrence of the fault, the damaged element processor node PN1 is allowed to change in to the offline state since the normal element processor nodes PN2 and PN3 continue the online processing as shown in FIG. 5.

The element processor node performs the repair processing in order to eliminate a cause of the fault after getting to the offline state by itself in the case of detecting the fault. For example, it is possible to perform the repair processing in a state the power is kept switched ON as to inversion of bit information of the memory 3 detected by the error detecting and correcting circuit 6. Furthermore, the central processing unit 1 is reset automatically and initialized again in a case the fault is detected by the watchdog timer 5. In a case where the automatic repairing process is impossible, the repair processing can be also performed artificially.

In this case, it is necessary to restore the repaired element processor node into the system in operation after testing its normality, so that agreement of the timing with the calculation result data is required as described below.

Figure 6:
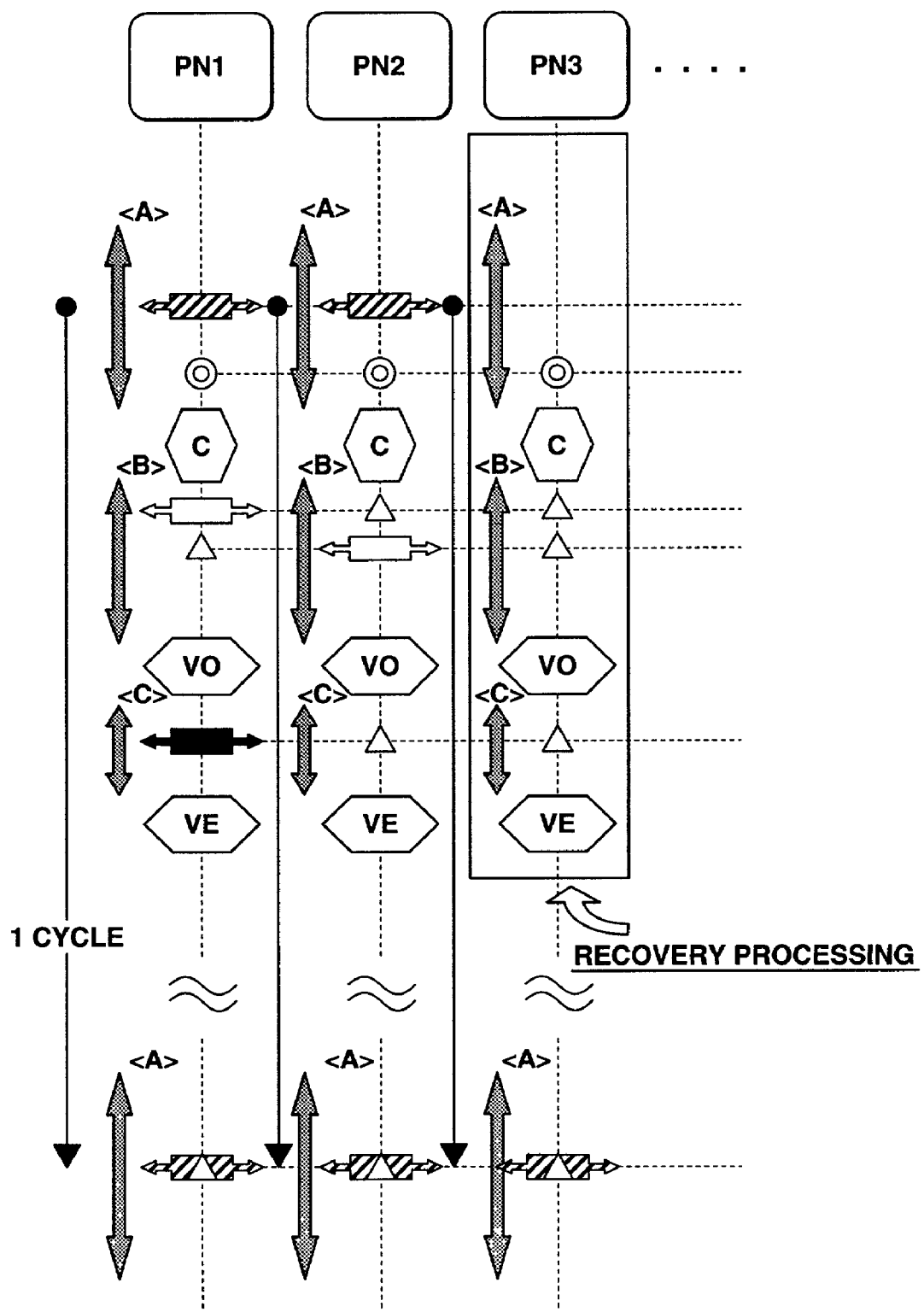
FIG. 6 is an explanatory drawing showing a recovery processing flow of the damaged element processor node.

The damaged element processor node PN3 autonomously acquires the data to be provided to the information transfer medium DF from the normal element processor nodes PN1 and PN2 continuing their online processing, that is the input data-request message, the input data, the calculation result data or the calculation result data inclusive of the integrated value and the output data after performing the repair processing in the offline state by itself (after the initialization in a case of occurrence of resetting or the power-OFF) as shown in FIG. 6, and actuates its own cycle timer and the respective windows <A> to <D> so as to coincide (synchronization) its own timing to that of the system in the online processing.

While the element processor node PN3 to be restored performs the required calculation processing using the input data acquired from the information transfer medium DF similarly to the aforementioned routine processing, the result data obtained by its own calculation may not agree to the calculation result data by the other element processor nodes PN1 and PN2 over several times or several cycles in a case where the previous data is required for the calculation processing. The respective element processor nodes PN1 to PN3, therefore, has a function for stopping providing of their own calculation result into the information transfer medium DF until their own calculation result data coincides with the calculation result data obtained by the other element processor nodes. This one series of performance is recovery processing (Rec).

Additionally, the element processor node PN3 to be restored cannot determine what kind of data processing of the application is done in the other element processor nodes PN1 and PN2 in the recovery process thereof. Therefore, it is possible to coincide the data processing between the element processor node PN3 to be restored and the normal element processor nodes PN1 and PN2 by always providing internal situation data, such as present mode data and previous integration data from the respective element processor nodes or other data providing means (not shown) and causing the element processor node PN3 to be restored to acquire these internal situation data.

If the damaged element processor node PN3 is repaired properly, the result data obtained by its own calculation coincides with the other calculation result data by performing the calculation of the prescribed times (or prescribed number of cycles: three cycles in FIG. 7) as shown in FIG. 7, and it becomes possible to provide its own calculation result data to the information transfer medium DF in the next time, and recover the routine processing RP. In other words, the damaged element processor node PN3 recover the online state normality autonomously by synchronizing its own timing with the data processing by the normal element processor nodes PN1 and PN2 after autonomously testing its own normality.

In such a manner, the damaged element processor node PN3 is restored autonomously after collecting required information from the information transfer medium DF without exerting any influence on the normal element processor nodes PN1 and PN2 in the online processing as shown in FIG. 7. Consequently, it is possible not to disturb the online processing at all and not to lower the redundancy. Additionally, the aforementioned repair processing may be applied in also a case where two or more element processor nodes is repaired and recovered in the same time, and it is applicable in a case at least one of the element processor nodes is kept in normal.

An explanation will be given below concerning performance at the time of switching ON the power source of the system.

In application so designed as to provide the input data in to the multiprocessing system in arbitrary timing, the performance at the time of switching ON the power source is merely waiting for the input data to be provided to the information transfer medium DF from the data source IP. On the other hand, in a case where the multiprocessing system has to cyclically request the input data for the data source IP, it is generally impossible for the respective element processor nodes PN1 to PN3 to distinguish whether only its own power is turned ON or reset, and the power of the whole system is turned ON according to the occurrence of the fault. To this situation, this multiprocessing system is possible to determine autonomously that the power source of the system turns ON without using any special means by hardware.

Figure 8:
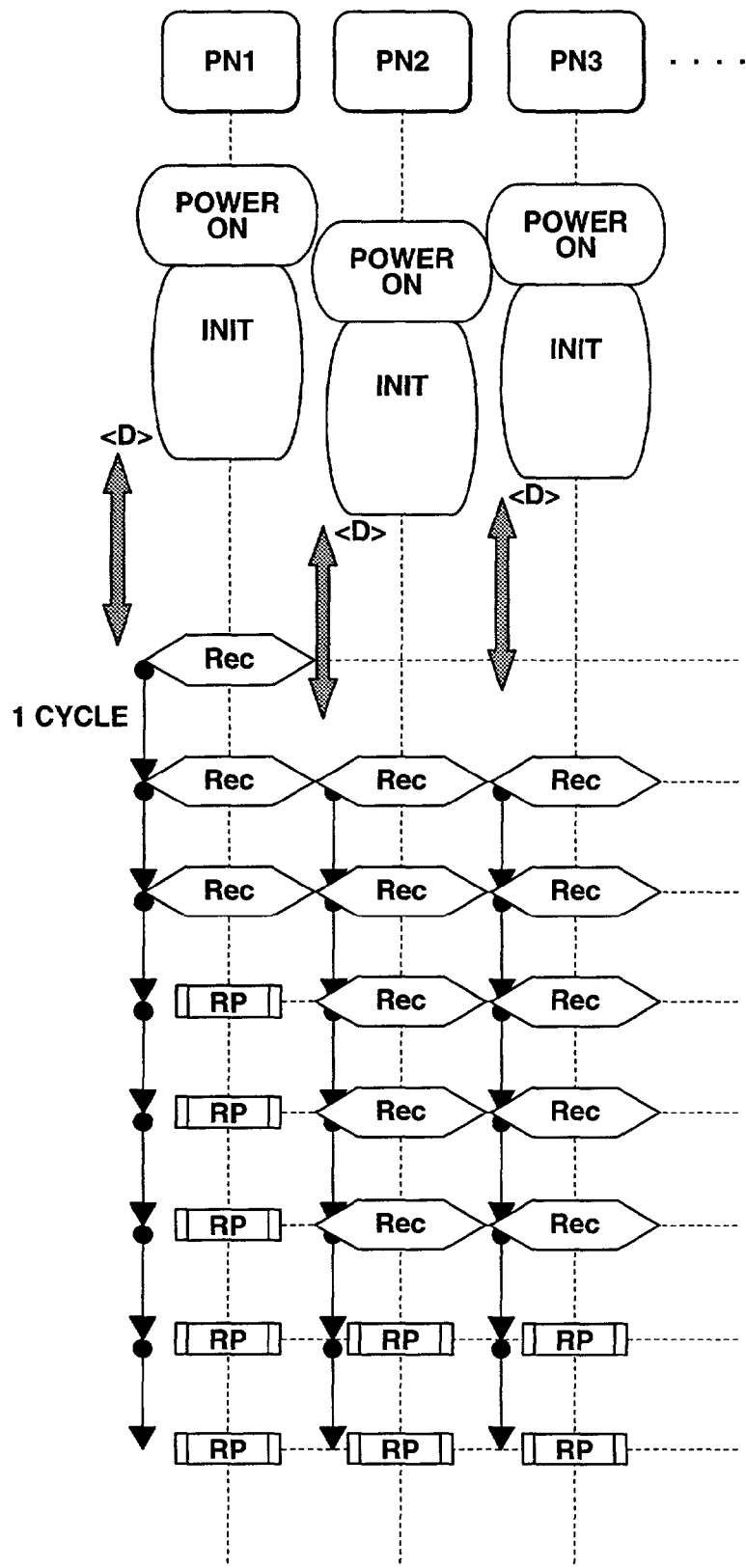
FIG. 8 is an explanatory drawing showing a processing flow when the system power is turned ON, and FIG. 9 is a block diagram illustrating another embodiment of the multiprocessing system to which the multiprocessing method according to this invention is applied.

In other words, there are generally differences in the timing of turning ON the respective processor node PN1 to PN3 at the time of switching ON the power source of the system as shown in FIG. 8. Additionally, the respective processor nodes PN1 to PN3 starts the window <D> after the initializing processing INIT as described with reference to the repair processing. At this time, if there is any other element processor node in operation, the data provided from the other element processor nodes must be acquired in the window <D> through the information transfer medium DF since the period of window <D> is set so as to be longer than the cycle Tc of the routine processing RP. However, the data are never acquired at the time of switching ON the power source of the system, and the window <D> comes into "time-up" when the prescribed time is up.

Consequently, the element processor node PN1, which comes into "time-up" in the first place in the example shown in FIG. 8, determines the power source of the system to be switched ON repeats the recovery processing Rec prescribed time and starts the routine processing RP to provide the calculation result data into the information transfer medium DF as the normal operation after collecting the previous data required for the calculation C. In a case where the power source of the system is determined to be switched ON in such a manner, the other data are not acquired during the recovery processing Rec, and it is not necessary to satisfy the requirement for the coincidence between the calculation result data.

Then, the other element processor nodes PN2 and PN3 acquire the data provided to the information transfer medium DF from the first restored element processor node PN1 and participates the routine processing RP successively. Whereby, dedicated lines or so become unnecessary for notifying the respective element processor node PN1 to PN3 that the power source of the system power is in the ON-state, and it becomes possible to deal with the case the power source of the system is switched ON, in the same manner as the recovery processing.

Incidentally, it is necessary to take account of influence of the cosmic radiation in a case of applying the multiprocessing system as an on-board computer of the space vehicle. As influence of the cosmic radiation on electronic parts, especially semiconductor parts, there are total dose effect and single event effect. The former is a permanent damage caused by accumulated effect of the total radiant rays injected into the parts, and the latter is induced by occurrence of an electron-hole pair alone the trajectory caused by incidence of a single high-energy particle. Furthermore, the single event effect is divided into single event upset (SEU) effect that electric charge produced by the incident particle causes bit inversion of storage elements, and single event latch-up (SEL) effect that an excessive current flows according to incoming of the electric charge into a part of parasitic thyristor inevitably formed in CMOSIC or so.

With respect to the total dose effect measures can be taken by examining the amount of dose to induce a hindrance in a irradiation test of radiant rays on the earth in advance, comparing it with the total amount of dose in the scheduled orbit and providing a spot-shield and the like for the parts.

Concerning the single event upset effect, it is possible to detect by providing the error detecting and correcting circuit 6 for the memory 3, providing the watchdog timer 5 for the central processing unit 1, or comparing the calculation result data of distributed nodes with each other, and it is possible to recover by rewriting value of the memory cell in which upset occurs. On the other hand, as to the single event latch up effect, the permanent fault is avoidable by switching OFF once and switching ON the power for this device again after detecting the overcurrent through the overcurrent detecting and repairing circuit 7 and putting a limitation of electric current. In such a manner, it is possible to deal the single event effect as a transient fault by performing the aforesaid proper processing.

As described above, although this multiprocessing method is the loosely coupled system (asynchronous system) used with the plural element processor nodes that are driven by individual clocks, the data processing is started by the respective element processor nodes according to their own judgment, and the excellent online processing is performed by synchronizing the respective data processing by each of the element processor nodes, and it is possible to autonomously restore the damaged element processor node as keeping the online processing satisfactory even in a case of occurrence of the fault in one or more of the element processor nodes. Further, it is possible to cope with the influence of the cosmic radiation as described above, and the method can to be sufficiently adapted to the application for the space vehicle, and needless to say can be applied generally to the control application, so that it is excellent in the versatility from a stand point of possible to be applied to the various application independently of the control cycle or the operating time.

Figure 9:
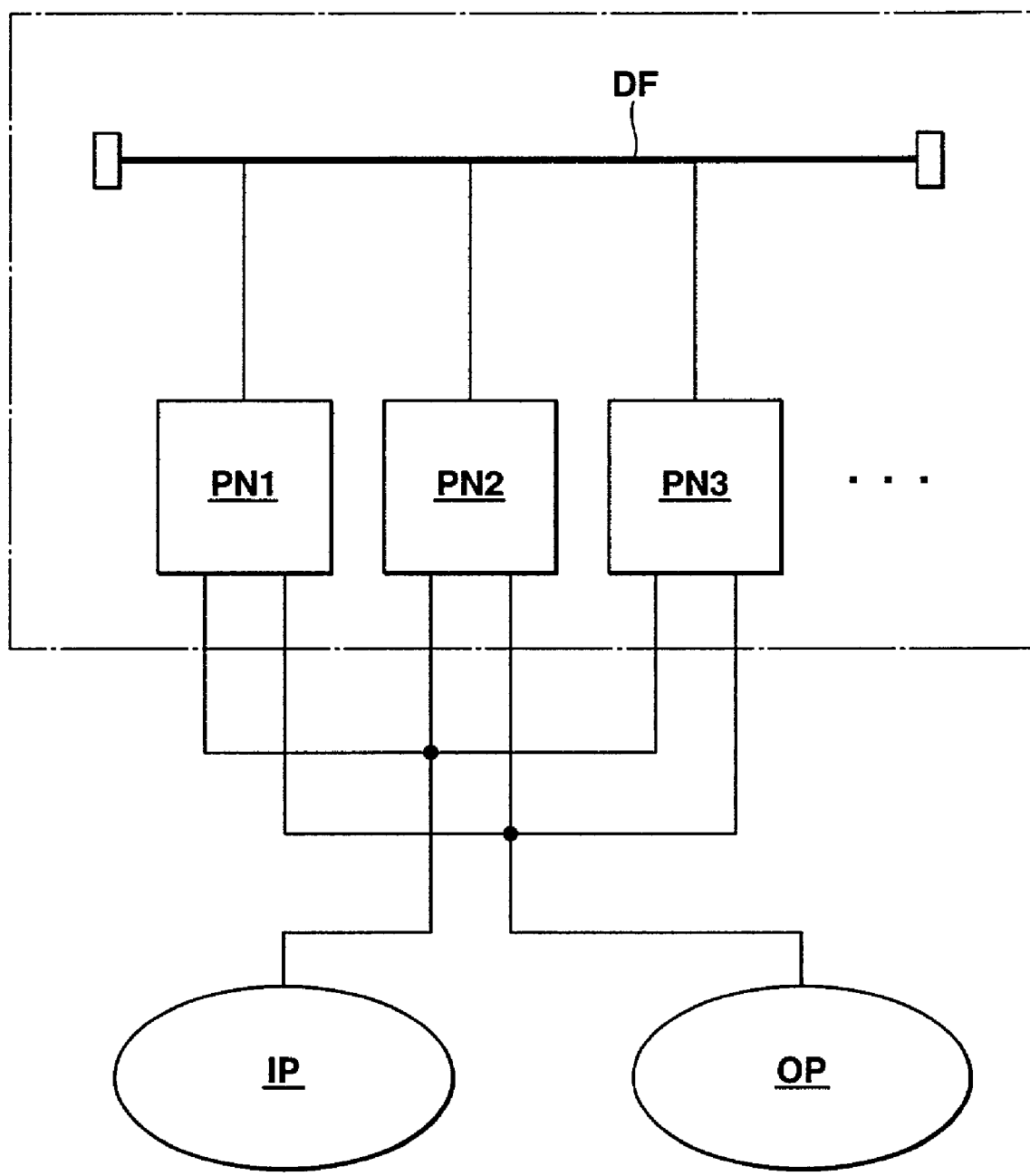

FIG. 9 is a drawing illustrating another embodiment of the multiprocessing system to which the multiprocessing method according to this invention is applied.

Although the explanation is given in the former example about the case where the information transfer medium DF intervenes between the data source IP, the output target OP and the respective element processor nodes PN1 to PN3, and each of data is provided and acquired through the information transfer medium DF, the respective element processor node PN1 to PN3 driven by the individual clocks are connected to the information transfer medium DF through the bus, and the data source IP and the output target OP are directly connected to the respective element processor nodes PN1 to PN3 through dedicated lines in this example. In this case, the parts may be adopted in the same manner as the former example excepting the above-mentioned formation and function and the element processor nodes PN1 to PN3 and the information transfer medium DF is not restricted in number.

In this example, the respective element processor nodes PN1 to PN3 directly are inputted with the input data from the data source IP and directly outputs the output data to the output target OP, and provides and acquires various data such as the input data-request message, the calculation result data, the output data for the verification and the internal situation data and so on thorough the information transfer medium DF, accordingly it is possible to obtain the similar functions and effects as the former example in the normal online processing and the autonomous recovery after the occurrence of the fault.

What is claimed is:

1. A multiprocessing method for performing a calculation through a plurality of element processor nodes on input data inputted from a data source and outputting a calculation result to an output target as output data by using the element processor nodes, each driven by its own clock, and an information transfer medium through which the element processor nodes provide data to and acquire data from each other, wherein each of the element processor nodes begins cyclic data processing according to its own judgment at a time of providing or acquiring trigger data, performs a predetermined calculation after acquiring the input data from the data source to provide its calculation result to the information transfer medium, and acquires at least one other calculation result provided by another element processor node from the information transfer medium to determine an operation result obtained from the calculation results through a logical decision operation as the output data;

wherein the output data is output to the output target from one of the element processor nodes having the output data; and wherein while at least one element processor node recovers from a fault, the data processing being performed by other processor nodes is not interrupted.

2. A multiprocessing method as set forth in claim 1, wherein each of the element processor nodes includes a window function for determining data acquired within a predetermined time as normal data and for determining data acquired out of the predetermined time as abnormal data.

3. The multiprocessing method as set forth in claim 1, wherein each of the element processor nodes is operable to detect a presence of its own fault, and wherein an element processor node detecting its own fault acquires the input data, acquires the calculation result provided to the information transfer medium by at least one normally operating element processor node after going into an offline state and performing repair processing individually, and autonomously recovers its online state by synchronizing with a data processing cycle of the at least one normally operating element processor node if the calculation result obtained by its own calculation coincides with the calculation result obtained by the at least one normally operating element processor node.

4. The multiprocessing method as set forth in claim 3, wherein the element processor node detecting its own fault stops providing data to the information transfer medium until the calculation result obtained by its own calculation coincides with the calculation result obtained by the at least one normally operating element processor node.

5. A multiprocessing method for performing a calculation through a plurality of element processor nodes on input data inputted from a data source and outputting a calculation result to an output target as output data by using the element processor nodes, each driven by its own clock, and an information transfer medium through which the element processor nodes provide data to and acquire data from each other, wherein each of the element processor nodes begins cyclic data processing according to its own judgment at a time of providing or acquiring trigger data, performs a predetermined calculation after acquiring the input data from the data source to provide its calculation result to the information transfer medium, and acquires at least one other calculation result provided by another element processor node from the information transfer medium to determine an operation result obtained from the calculation results through a logical decision operation as the output data; and wherein the output data is output to the output target from one of the element processor nodes having the output data; and wherein the number of said element processing nodes that are performing data processing can be increased or decreased without interrupting the data processing being performed by other processor nodes.

6. A multiprocessing method as set forth in claim 5, wherein each of the element processor nodes includes a window function for determining data acquired within a predetermined time as normal data and for determining data acquired out of the predetermined time as abnormal data.

7. The multiprocessing method as set forth in claim 5, wherein each of the element processor nodes is operable to detect a presence of its own fault, and wherein an element processor node detecting its own fault acquires the input data, acquires the calculation result provided to the information transfer medium by at least one normally operating element processor node after going into an offline state and performing repair processing individually, and autonomously recovers its online state by synchronizing with a data processing cycle of the at least one normally operating element processor node if the calculation result obtained by its own calculation coincides with the calculation result obtained by the at least one normally operating element processor node.

8. The multiprocessing method as set forth in claim 7, wherein the element processor node detecting its own fault stops providing data to the information transfer medium until the calculation result obtained by its own calculation coincides with the calculation result obtained by the at least one normally operating element processor node.

9. A multiprocessing method for performing a calculation through a plurality of element processor nodes on input data inputted from a data source and outputting a calculation result to an output target as output data by using the element processor nodes, each driven by its own clock, and an information transfer medium through which the element processor nodes provide data to and acquire data from each other, wherein each of the element processor nodes begins cyclic data processing according to its own judgment at a time of providing or acquiring trigger data, performs a predetermined calculation after acquiring the input data from the data source to provide its calculation result to the information transfer medium, and acquires at least one other calculation result provided by another element processor node from the information transfer medium to determine an operation result obtained from the calculation results through a logical decision operation as the output data; and wherein the output data is output to the output target from one of the element processor nodes having the output data;

wherein while at least one element processor node recovers from a fault, the data processing being performed by other processor nodes is not interrupted; and wherein the number of said element processing nodes that are performing data processing can be increased or decreased without interrupting the data processing being performed by other processor nodes.

10. A multiprocessing method as set forth in claim 9, wherein each of the element processor nodes includes a window function for determining data acquired within a predetermined time as normal data and for determining data acquired out of the predetermined time as abnormal data.

11. The multiprocessing method as set forth in claim 9, wherein each of the element processor nodes is operable to detect a presence of its own fault, and wherein an element processor node detecting its own fault acquires the input data, acquires the calculation result provided to the information transfer medium by at least one normally operating element processor node after going into an offline state and performing repair processing individually, and autonomously recovers its online state by synchronizing with a data processing cycle of the at least one normally operating element processor node if the calculation result obtained by its own calculation coincides with the calculation result obtained by the at least one normally operating element processor node.

12. The multiprocessing method as set forth in claim 11, wherein the element processor node detecting its own fault stops providing data to the information transfer medium until the calculation result obtained by its own calculation coincides with the calculation result obtained by the at least one normally operating element processor node.

* * * * *